No. 761,596. PATENTED MAY 31, 1904.
E. MOSS.
SOLAR HEATER.
APPLICATION FILED DEC. 9, 1903.
NO MODEL.
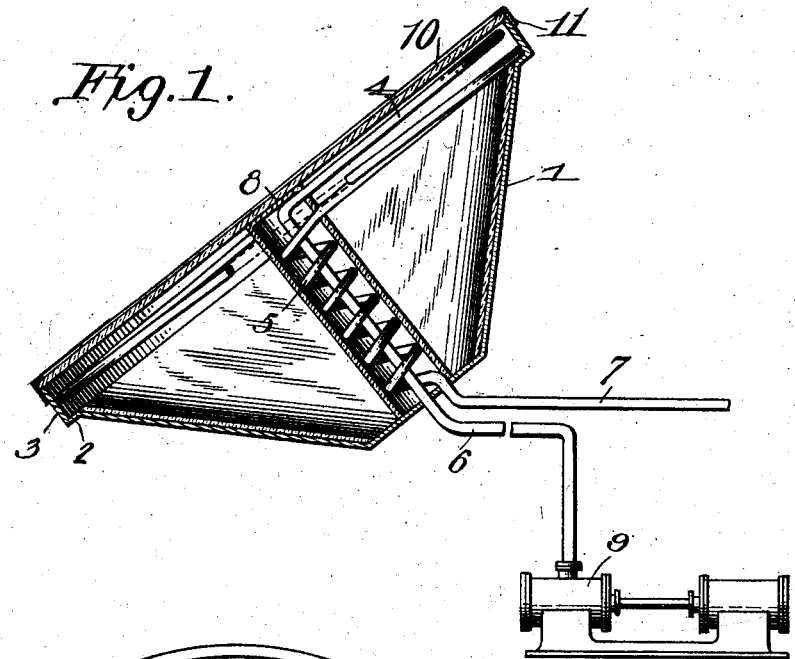
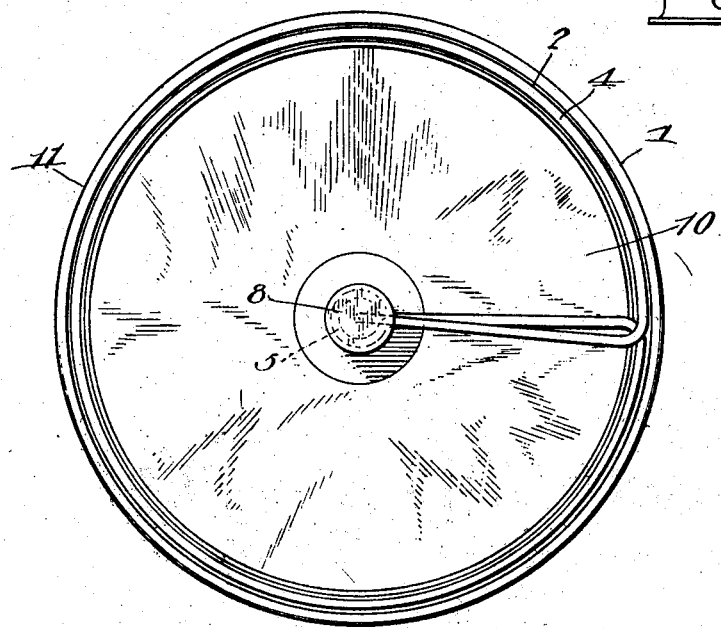
Eric Moss, Inventor.
Witnesses
by C. A. Snow & Co.
Attorneys No. 761,596.

Patented May 31, 1904.

UNITED STATES PATENT OFFICE.

ERIC MOSS, OF KINGSBURG, CALIFORNIA.

SOLAR HEATER.

SPECIFICATION forming part of Letters Patent No. 761,596, dated May 31, 1904.

Application filed December 9, 1903. Serial No. 184,458. (No model.)

*To all whom it may concern:*

Be it known that I, ERIC MOSS, a citizen of the United States, residing at Kingsburg, in the county of Fresno and State of California, have invented a new and useful Solar Heater, of which the following is a specification.

This invention relates to solar heaters; and it has for its object to provide a device of this class for utilizing the heat of the sun for practical purposes.

The invention consists in the improved construction, arrangement, and combination of parts, which will be hereinafter fully described, and particularly pointed out in the claims.

In the accompanying drawings, Figure 1 is a vertical sectional view of a solar heater constructed in accordance with the principles of my invention. Fig. 2 is a plan view of the same.

Corresponding parts in both figures are indicated by similar numerals of reference.

1 designates a funnel-shaped or inverted-frustum-shaped reflector, which is provided at its upper edge with an annular flange 2, supporting a cylindrical rim 3. The flange 2 supports a helix comprising several large coils of pipe 4, the lower coil of which is extended to form a smaller helix 5, extending vertically to and through the bottom of the reflector, being provided with an extension 6. The uppermost coil of the large helix is extended vertically through the coils of the smaller helix and through the bottom of the reflector, being provided with a lateral extension 7. Suitably supported upon the bottom of the reflector is a cylinder 8, of glass, which extends to the top of the reflector. This cylinder incloses the vertically-disposed helix 5, so as to prevent loss of heat. The reflector is provided with a cover 10, of glass, which is provided with a flange 11, engaging the upper edge of the cylindrical rim 3, and which is thereby held in position to exclude dust and other impurities, as well as to prevent loss of heat.

In operation any suitable fluid, such as air or water, may be forced through the coils of the apparatus by means of a pump, conventionally shown at 9, and which forces the liquid through the pipe 6, through the coils of the large and the small heaters, and finally through the pipe 7 to the point of consumption. The heated liquid may be directly utilized, or when deprived of its heat it may be returned by means of the pump to circulate through the apparatus. The coils 4 and 5 being exposed to the reflected rays of the sun will become highly heated, thereby heating the fluid passing through said pipes. The coils 4 being of large area will cause the fluid passing therethrough to receive preliminary heating, while during its passage through the coil 5 the said fluid will not only be protected from loss of heat, but will be raised to an extremely high temperature, loss of heat being prevented by the surrounding cylinder of glass, which, as is well known, is non-diathermanous to the heat absorbed by the coils.

It is obvious that in the operation of the device the latter will be tilted by any suitable means in order that the rays of the sun may be reflected directly upon the heating-coils of the apparatus.

While I have in the foregoing described only a single pipe passing through the reflector, it is obvious that, especially in a large apparatus, a plurality of pipes may be used—such as, for instance, when it shall be desired to force water through one pipe and air through another for the purpose of raising the temperature of such water and air for a variety of purposes. Be it understood, therefore, that I do not limit myself to the use of a single pipe, but reserve the right to use in a single apparatus two or more pipes when coiled and arranged substantially as herein described and for the purposes set forth.

Having thus described my invention, I claim—

1. In a solar heater, a conical reflector having a cylindrical extension, a pipe coiled in said extension, a smaller coil connected with one end of the large coil and extending through the bottom of the reflector, an extension of the other end of the large coil extending through the smaller coil and through the bottom of the reflector, and means for forcing fluid through said coils.

2. In a solar heater, a conical reflector having a cylindrical extension, a pipe coiled in said extension, a smaller coil connected with one end of the large coil and extending through the bottom of the reflector, an extension of the other end of the large coil extending through the smaller coil and through the bottom of the reflector, a transparent cylinder resting upon the bottom of the reflector and surrounding the smaller coil, and means for forcing fluid through said coils.

3. In a solar heater, a conical reflector provided at its upper edge with an annular flange supporting a cylindrical rim, a pipe coiled within said rim and supported upon said flange, a transparent cylinder resting upon the bottom of the reflector, a coil within said cylinder forming an extension of one end of the large coil, an extension of the other end of the large coil passing through the smaller coil, and means for forcing fluid through said coils.

4. In a solar heater, a conical reflector having a cylindrical extension, pipes coiled in said extension, smaller coils each connected with one end of each of the large coils and extending through the bottom of the reflector, extensions of each of the larger coils extending through the smaller coils and through the bottom of the reflector, a transparent cylinder resting upon the bottom of the reflector and surrounding the smaller coils, and means for forcing fluid through said coils.

In testimony that I claim the foregoing as my own I have hereto affixed my signature in the presence of two witnesses.

ERIC MOSS.

Witnesses:
JOHN OLSON,
J. A. GUSTAFSON.